US008043111B2

(12) United States Patent
Takahashi et al.

(10) Patent No.: US 8,043,111 B2
(45) Date of Patent: Oct. 25, 2011

(54) CONNECTOR

(75) Inventors: Toshiharu Takahashi, Shizuoka (JP); Motoyoshi Suzuki, Shizuoka (JP); Kenji Kajikawa, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 12/155,537

(22) Filed: Jun. 5, 2008

(65) Prior Publication Data

US 2008/0303272 A1    Dec. 11, 2008

(30) Foreign Application Priority Data

Jun. 6, 2007    (JP) .............................. P. 2007-150224

(51) Int. Cl.
*H01R 13/58*    (2006.01)
(52) U.S. Cl. ..................... 439/464; 439/471; 285/149.1; 285/903; 174/72 A; 174/74 R
(58) Field of Classification Search ............... 285/149.1, 285/154.1, 236, 309, 903; 174/481, 68.1, 174/68.3, 72 A, 73.1, 74 R, 88 R, 95; 439/464, 439/578, 471, 583
See application file for complete search history.

(56) References Cited

U.S. PATENT DOCUMENTS

| | | | | | |
|---|---|---|---|---|---|
| 1,835,155 | A | * | 12/1931 | Harbert | 248/56 |
| 2,361,816 | A | * | 10/1944 | Blanchard | 285/148.17 |
| 2,952,730 | A | * | 9/1960 | Simonds | 174/153 G |
| 3,588,150 | A | * | 6/1971 | Wold | 285/381.5 |
| 3,794,960 | A | * | 2/1974 | Sugar | 439/459 |
| 3,890,459 | A | * | 6/1975 | Caveney | 174/101 |
| 4,035,051 | A | * | 7/1977 | Guy | 439/464 |
| 4,160,572 | A | * | 7/1979 | Adelberger et al. | 439/104 |
| 4,358,178 | A | * | 11/1982 | Guy | 439/464 |
| 4,440,425 | A | * | 4/1984 | Pate et al. | 285/149.1 |
| 4,491,350 | A | * | 1/1985 | Wolf et al. | 285/236 |
| 4,616,105 | A | * | 10/1986 | Borsh | 174/660 |
| 4,723,796 | A | * | 2/1988 | Nattel | 285/140.1 |
| 4,917,627 | A | * | 4/1990 | Hendricks | 439/371 |
| 5,129,684 | A | * | 7/1992 | Lawrence et al. | 285/288.1 |
| 5,180,196 | A | * | 1/1993 | Skinner | 285/253 |
| 5,285,013 | A | * | 2/1994 | Schnell et al. | 174/669 |
| 5,382,756 | A | * | 1/1995 | Dagan | 174/92 |
| 5,747,733 | A | * | 5/1998 | Woods et al. | 174/481 |
| 6,371,154 | B1 | * | 4/2002 | Kesterman et al. | 137/315.01 |
| 6,540,547 | B2 | * | 4/2003 | Zweigle | 439/468 |
| 6,581,984 | B1 | * | 6/2003 | Seung-Kyu | 285/368 |
| 6,607,218 | B2 | * | 8/2003 | Sakazaki et al. | 285/226 |
| 6,730,847 | B1 | * | 5/2004 | Fitzgerald et al. | 174/77 R |
| 6,997,758 | B2 | * | 2/2006 | De Buyst et al. | 439/797 |

(Continued)

FOREIGN PATENT DOCUMENTS

JP    A-10-027645    1/1998

*Primary Examiner* — James Hewitt
(74) *Attorney, Agent, or Firm* — Morgan, Lewis & Bockius LLP

(57) ABSTRACT

Either of first and second corrugated tubes having different groove (or ridge) pitches can be mounted on a connector 10. In this case, the distance between a first retaining projection 32 and a second retaining projection 34 is a common multiple of these pitches, and therefore either of the two different corrugated tubes can be properly retained on both of the first and second retaining projections 32 and 34. Furthermore, either of the first and second corrugated tubes 50 and 52 of different diameters can be properly fixed to a tube insertion portion 20 by a binding band passed through binding band passage holes 30.

2 Claims, 12 Drawing Sheets

U.S. PATENT DOCUMENTS

| | | | | |
|---|---|---|---|---|
| 7,021,959 B2 * | 4/2006 | Tsuji et al. | | 439/470 |
| 7,128,601 B2 * | 10/2006 | Suemitsu et al. | | 439/521 |
| 7,390,967 B2 * | 6/2008 | Daito | | 174/72 A |
| 2007/0187144 A1 * | 8/2007 | Kato | | 174/72 A |
| 2007/0236010 A1 * | 10/2007 | Campau | | 285/242 |

* cited by examiner

CONNECTOR

BACKGROUND OF THE INVENTION

1. Field of the Invention

This invention relates to a connector on which a tube having an outer peripheral surface of a bellows-shape or a spiral shape can be mounted.

2. Description of the Related Art

A corrugated tube is used to protect a wire extending from a housing of a connector or to neatly arrange the wiring comprising a plurality of such wires. This corrugated tube has a so-called bellows structure such that ridge folds (also called "convex portions" or "ridge portions") and groove folds (also called "concave portions" or "groove portions") are alternately arranged on its peripheral surface in the longitudinal direction. This corrugated tube can be bent to a certain degree.

For mounting the corrugated tube on the connector, a cover is, in some cases, fitted on the outer periphery of the corrugated tube, with retaining means retainingly engaged with the groove fold of the corrugated tube. With respect to such a structure, there has been disclosed a technique of enhancing the efficiency of the cover-mounting operation (see, for example, Patent Literature 1).

In this technique, one cover is formed by a pair of half-split parts of the same shape which are combined together in such a manner that the two half-split parts are disposed in inverted relation to each other with respect to the axis. Therefore, the time and labor required for properly selecting two parts of different shapes are saved when attaching the cover, thereby enhancing the efficiency of the operation, and also stock management for a plurality of parts is avoided, thereby reducing the cost. Furthermore, a plurality of retaining plates (formed on an inner surface of each half-split part and extending in a circumferential direction) and retaining grooves (each formed between the adjacent retaining plates) are fitted to the groove portions (groove folds) of the bellows-like corrugated tube. Therefore, the corrugated tube is positively fixed to the connector.

Patent Literature 1: JP-A-10-27645

In the technique disclosed in the above Patent Literature 1, the retaining plates and the retaining grooves formed at the inner surface of each half-split part are fitted to the groove portions of the bellows-like corrugated tube. In this construction, however, it has been necessary to change the structure of the connector, depending on the kind of corrugated tube to be used. Therefore, when the corrugated tube is different in size and also in pitch (the distance between the groove portions), it has been necessary to use a connector of another structure. When a plurality of kinds of corrugated tubes are used in a production line of a plant or the like, a plurality of kinds of connectors corresponding respectively to these corrugated tubes are used, and therefore at the production site, it has been desired to reduce the number of kinds of connectors to be used. Furthermore, it has been required to produce connectors designed particularly for those corrugated tubes which have not been frequently used, and from the viewpoint of the production cost including a mold cost, it has been desired to avoid such connector specifications.

SUMMARY OF THE INVENTION

This invention has been made in view of the above circumstances, and an object of the invention is to provide a connector on which a tube having an outer peripheral surface of a bellows-shape or a spiral shape can be mounted and in which there is provided a technique of properly fixing a desired one of a plurality of kinds of tubes to the connector.

According to the present invention, there is provided a connector on which a tube having ridges and grooves formed on its outer peripheral surface can be mounted, the ridges as well as the grooves being arranged at a predetermined pitch; characterized in that the connector includes:

a tube insertion portion of a generally semi-cylindrical shape;

a plurality of retaining means which are formed on an inner side of the tube insertion portion so as to retain the tube inserted in the tube insertion portion, the retaining means being spaced a predetermined distance from each other in a direction from an open outer end of the tube insertion portion toward an inner end thereof; and a binding band restraining portion formed on an outer side of the tube insertion portion and extending in a direction of a periphery of the tube insertion portion, the binding band-restraining portion being adapted to position a binding band which fixes the tube to the retaining means when the tube is inserted in the tube insertion portion; and a band passage hole which is formed in the binding band-restraining portion, and is disposed between the plurality of retaining means, wherein the binding band can be passed through the band passage hole from the outer side of the tube insertion portion to the inner side thereof.

A desired one of a plurality of kinds of tubes can be mounted in the tube insertion portion, and the predetermined distance between the retaining means may be a common multiple of the ridge/groove pitches of the plurality of tubes.

In the present invention, the connector is so constructed that a desired one of the plurality of kinds of tubes, each having the outer peripheral surface of a bellows-shape or a spiral shape, can be mounted on this connector, and the predetermined distance between the plurality of retaining means is a common multiple of the ridge/groove pitches of the bellows-like or spiral tubes, and further the tube retained on the retaining means can be fixed to the connector by the binding band. Therefore, a desired one of the plurality of kinds of tubes can be properly fixed to the connector.

DESCRIPTION OF THE PREFERRED EMBODIMENTS

A preferred embodiment of the present invention will now be described with reference to the drawings.

Figure 1:
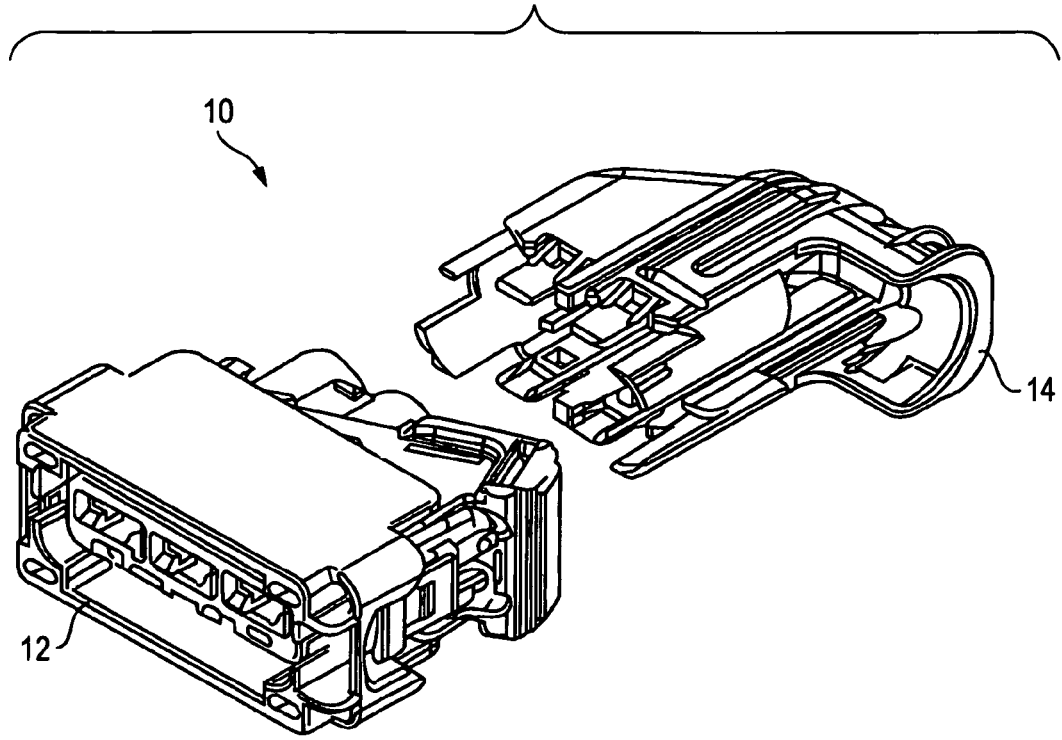
FIG. 1 is a view broadly showing the construction of a preferred embodiment of a connector of the preset invention.

FIG. 1 is a view broadly showing the construction of one preferred embodiment of a connector 10 of the preset invention, and more specifically FIG. 1 is an exploded perspective view showing a condition in which a connector housing 12 and a connector cover 14 which are constituent elements are separated from each other. The connector 10 is molded, for example, of a resin.

A plurality of terminals (not shown) are received within the connector housing 12, and wires (not shown) are connected respectively to these terminals. In the illustrated embodiment, these wires extend toward the connector cover 14.

Figure 2:
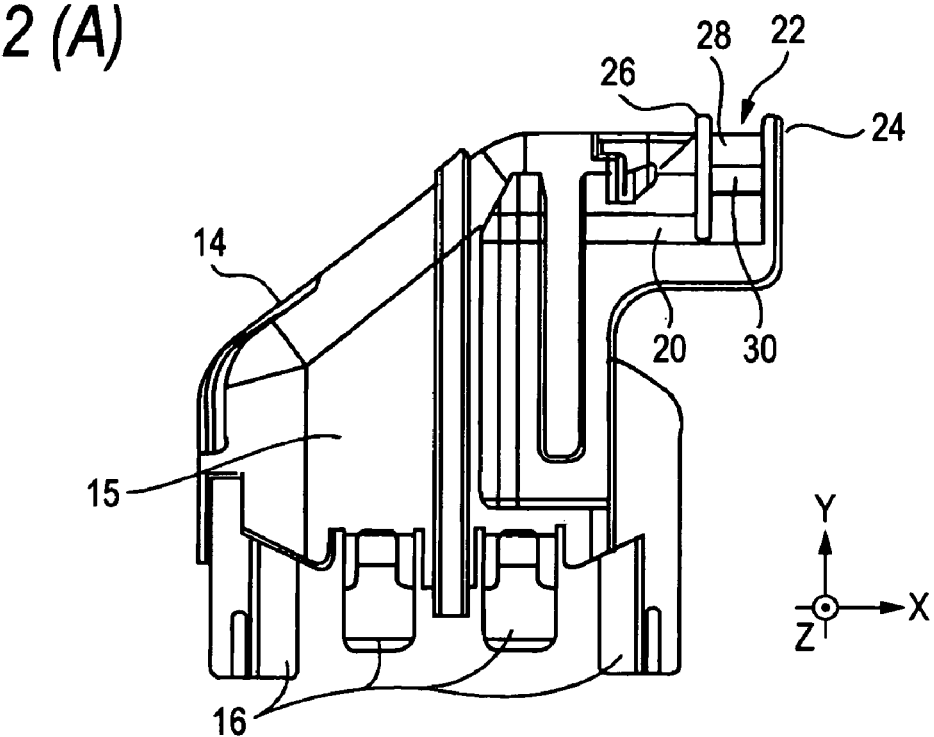
FIGS. 2A and 2B are a side-elevational view and a bottom view of a connector cover of the connector, respectively.
Figure 2:
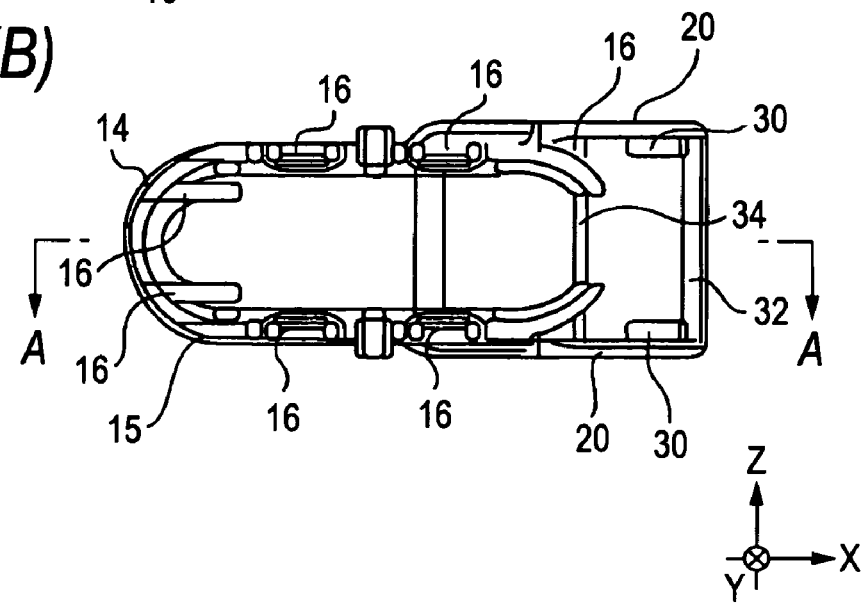
Figure 3:
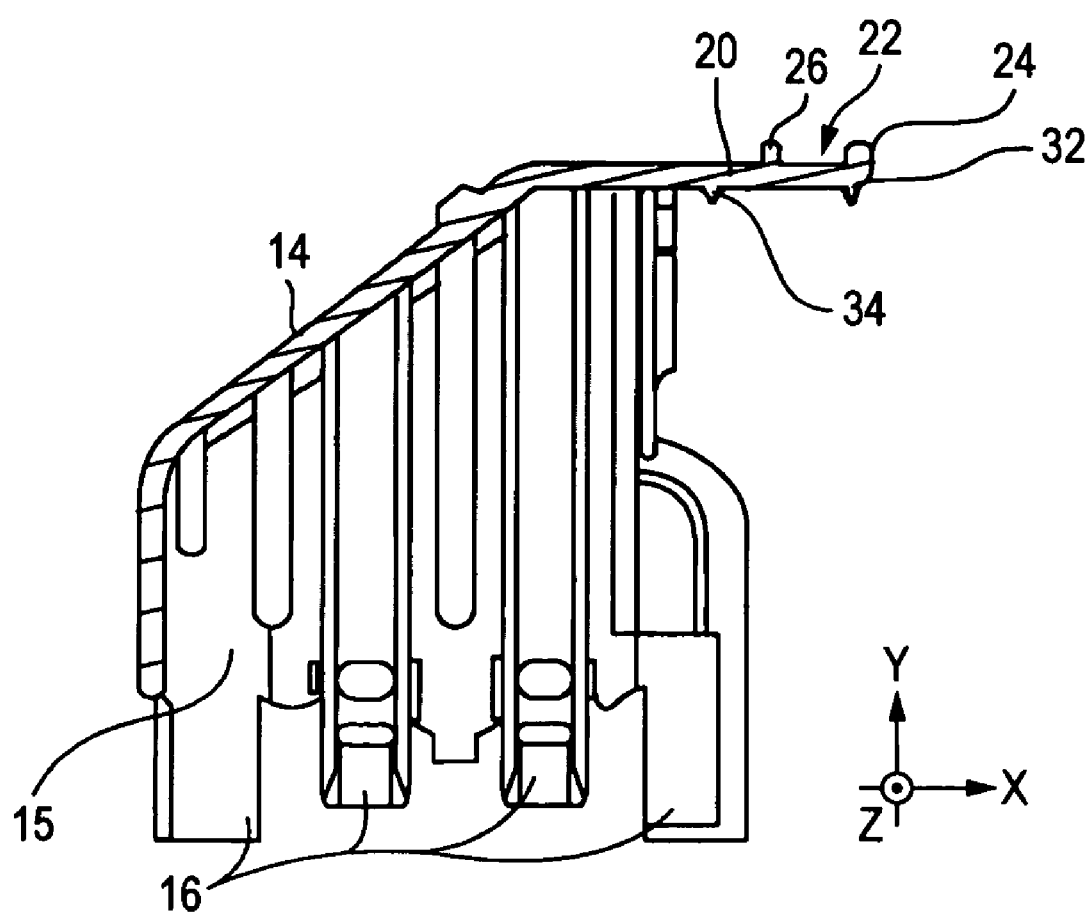
FIG. 3 is a cross-sectional view of the connector cover taken along the line A-A of FIG. 2B.
Figure 4:
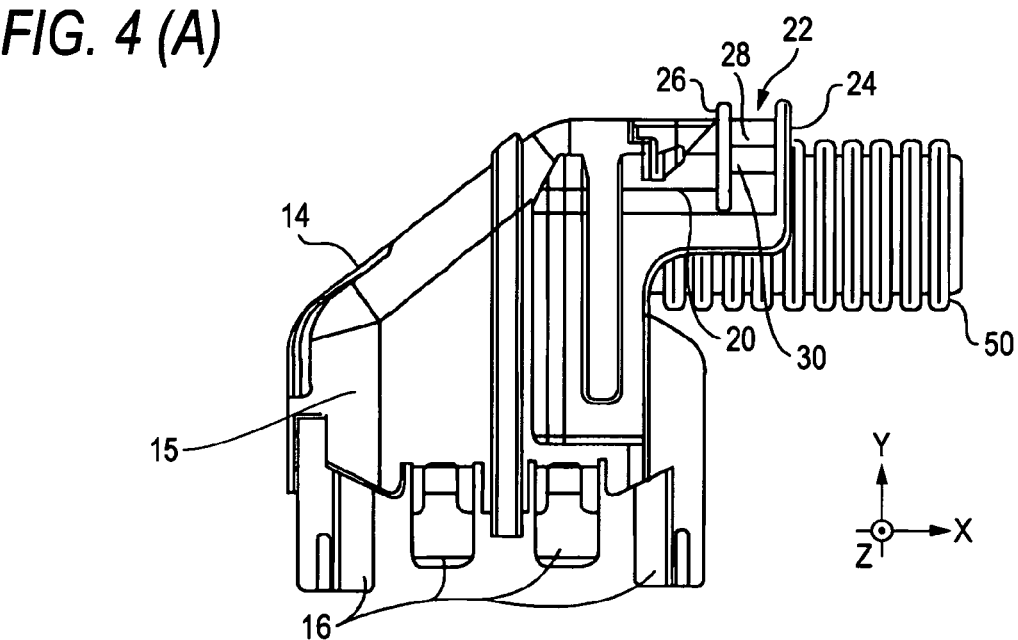
FIGS. 4A and 4B are the side-elevational view and the bottom view of the connector cover, showing a condition in which a first corrugated tube is mounted in a tube insertion portion.
Figure 4:
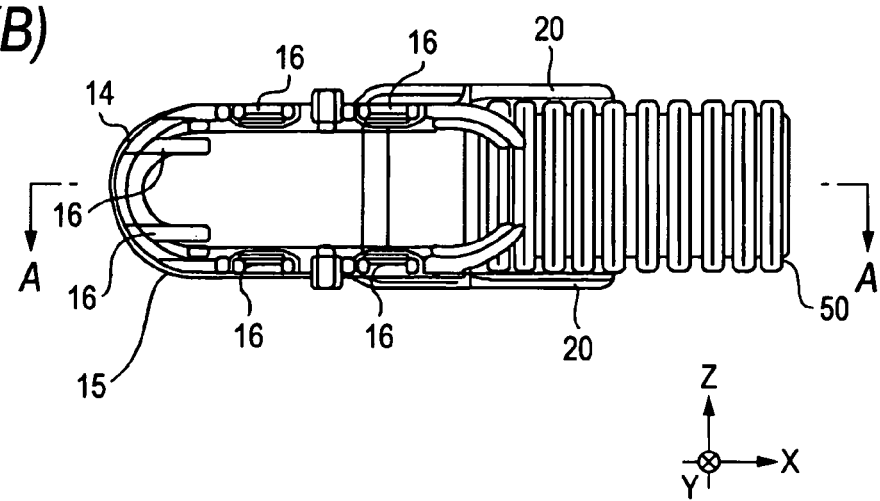
Figure 5:
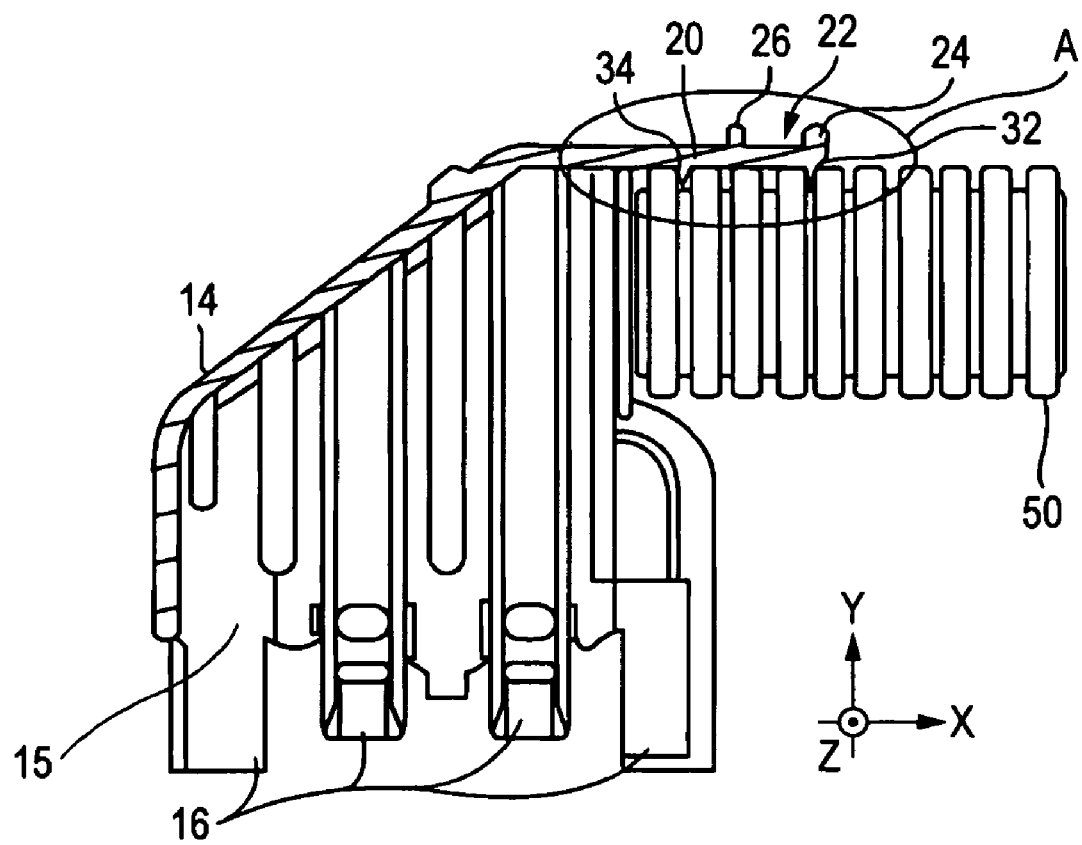
FIG. 5 is the cross-sectional view of the connector cover, showing the condition in which the first corrugated tube is mounted in the tube insertion portion.

FIGS. 2A and 2B show the appearance of the connector cover 14, and more specifically FIG. 2A is a side-elevational view, and FIG. 2B is a bottom view. FIG. 3 is a cross-sectional view of the connector cover 14 taken along the line A-A of FIG. 2B. FIGS. 4A and 4B are views similar to FIGS. 2A and 2B, but showing a condition in which a first corrugated tube 50 is mounted on the connector cover 14, and FIG. 4A is a side-elevational view, and FIG. 4B is a bottom view. FIG. 5 is a view similar to FIG. 3, but showing the condition in which the first corrugated tube 50 is mounted on the connector cover 14. Here, the first corrugated tube 50 is a tube having an inner diameter (nominal diameter) of 15 mm, and receives, for example, three 10 sq wires each having a standard outermost diameter f of 6.5 mm.

The connector cover 14 includes a cover body 15, fitting means 16 formed integrally with the cover body 15, and a tube insertion portion 20 formed integrally with the cover body 15. This connector cover 14 is generally bilaterally symmetrical with respect to the line A-A of FIG. 2B.

The cover body 15 is of a hollow construction having a cavity therein, and has a generally triangular shape when viewed from the side (or in cross-section). The cover body 15 has an opening formed at its lower side (at a minus side in a Y-axis direction), and also has an opening formed at its right side (at a plus side in an X-axis direction).

As shown in FIG. 2A, the fitting means 16 are formed at a peripheral edge of the opening formed at the lower side (the minus side in the Y-axis direction) of the cover body 15, and are fitted to the connector housing 12, and are retainingly engaged with retaining means (not shown) on the connector housing 12.

The tube insertion portion 20 is formed at the right side (the plus side in the X-axis direction) of the cover body 15 (where the opening is provided), and extends outwardly (toward the plus side in the X-axis). The first corrugated tube 50 is mounted in this tube insertion portion 20. The tube insertion portion 20 has a generally semi-cylindrical shape, and is open at its lower side (the minus side in the Y-axis direction). The outer periphery of the first corrugated tube 50 shown in FIGS. 4 and 5 confirms in shape to an inner periphery of a right open end of this tube insertion portion 20.

Figure 6:
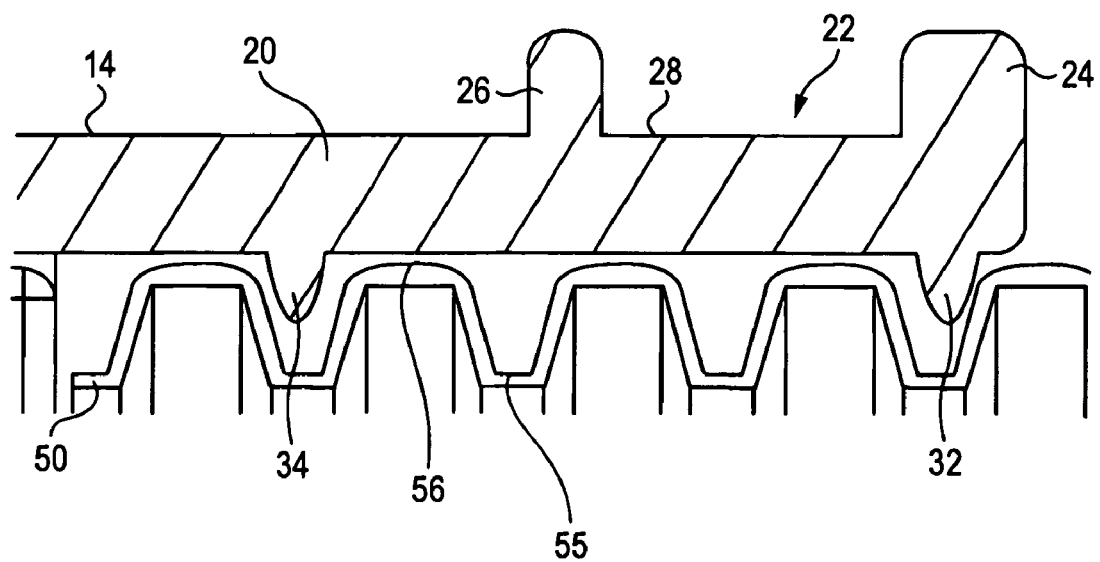
FIG. 6 is an enlarged view of a portion A of FIG. 5, showing the condition in which the first corrugated tube is mounted in the tube insertion portion.
Figure 9:
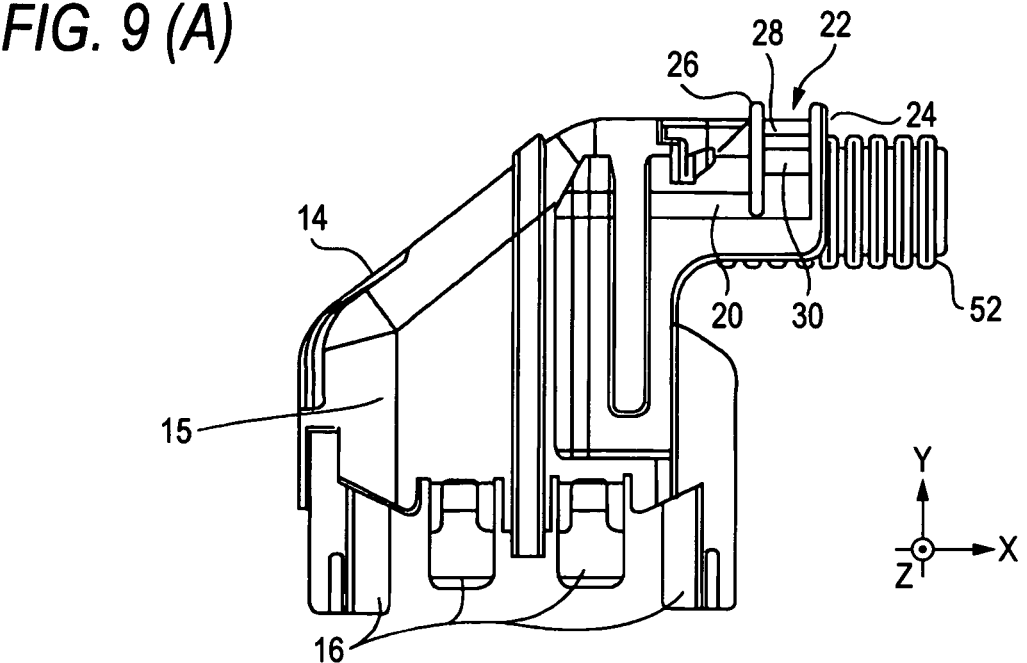
FIGS. 9A and 9B are the side-elevational view and the bottom view of the connector cover on which the second corrugated tube is mounted.
Figure 9:
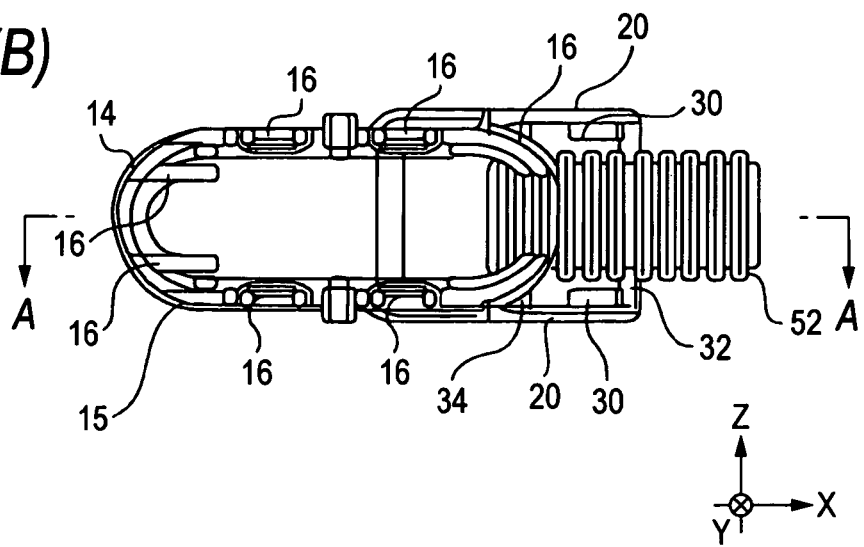

FIG. 6 is an enlarged view of a portion A of FIG. 5, showing the tube insertion portion 20. As shown in FIGS. 3, 5 and 6, a first retaining projection 32 of a predetermined height is formed on an inner peripheral surface of that portion of the tube insertion portion 20 disposed near to the right (the plus side in the X-axis direction) open end thereof. Further, a second retaining projection 34 is formed on the inner peripheral surface of the tube insertion portion 20, and is spaced a predetermined distance from the first retaining projection 32 (toward the minus side in the X-axis direction). Two groove folds (groove portions 55) of the first corrugated tube 50 are retainingly engaged with the first retaining projection 32 and the second retaining projection 34, respectively. In this embodiment, in order that a second corrugated tube 52 (see FIGS. 9 to 11) different in shape from the first corrugated tube 50 can also be mounted on the connector, the predetermined distance between the first retaining projection 32 and the second retaining projection 34 is determined, also taking the pitch of groove portions 57 of the second corrugated tube 52 into consideration. Namely, this predetermined distance is a common multiple of "the pitch of the groove portions 55 of the first corrugated tube 50" and "the pitch of the groove portions 57 of the second corrugated tube 52". This will hereafter more fully be described.

A binding band-restraining portion 22 is provided on an outer peripheral surface of that portion of the tube insertion portion 20 disposed near to the right (the plus side in the X-axis direction) open end thereof. The binding band-restraining portion 22 has a first limitation wall 24 and a second limitation wall 26 which extend in the circumferential direction and border two band passage holes 30 extending between the walls in the circumferential direction, and positions a binding band 60 (described later) when this binding band 60 is fixed to the tube insertion portion 20.

The first corrugated tube 50 is inserted into the tube insertion portion 20, and is retained by the first and second retaining projections 32 and 34 and in order to fix this condition, the binding band 60 (described later) is provided at the binding band-restraining portion 22, and the first corrugated tube 50 and the tube insertion portion 20 are bound together by this binding band 60. The binding band-restraining portion 22 is disposed between the first retaining projection 32 and the second retaining projection 34 in the X-axis direction. With this arrangement, the tube insertion portion 20 and the first corrugated tube 50 can be suitably bound together by the binding band 60.

In this embodiment, the second corrugated tube 52 different in diameter from the first corrugated tube 50 can also be mounted on the connector as described above. The second corrugated tube 52 different in shape from the first corrugated tube 50 shown in FIGS. 4 and 5 is mounted in the tube insertion portion 20. Namely, in the case where the second corrugated tube 52 has a small diameter, it is feared that the groove portions 57 of the second corrugated tube 52 may not be properly retained by the first retaining projection 32 and the second retaining projection 34 when the binding band 60 is wound on the outer periphery of the tube insertion portion 20. Therefore, two binding band passage holes 30 are formed through a binding band contact portion 28 of the binding band restraining portion 22, and the binding band 60 can be passed through each passage hole 30 from the outer side of the tube insertion portion 20 to the inner side thereof.

Next, the condition in which the first corrugated tube 50 is mounted in the tube insertion portion 20, as well as the condition in which the second corrugated tube 52 is mounted in the tube insertion portion 20, will be described.

Figure 7:
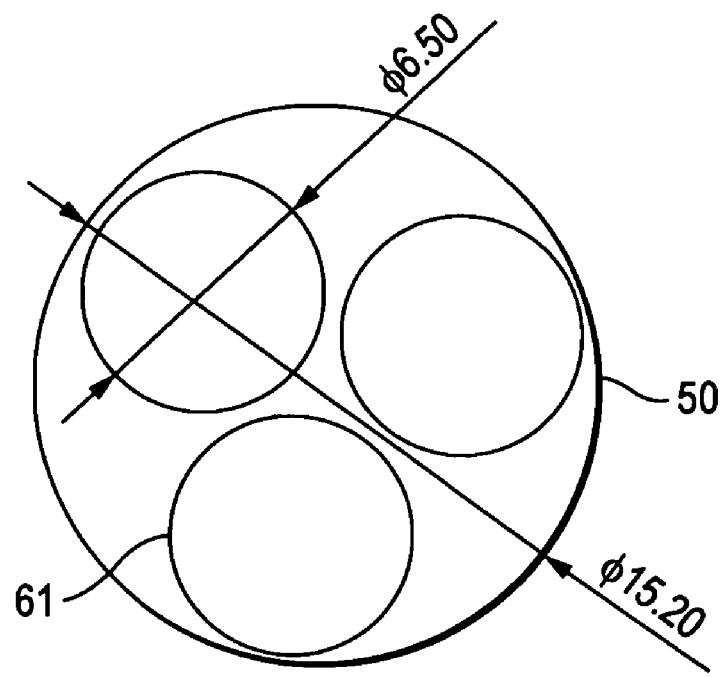
FIG. 7 is a schematic cross-sectional view showing a condition in which three 10 sq wires are received in the first corrugated tube.
Figure 8:
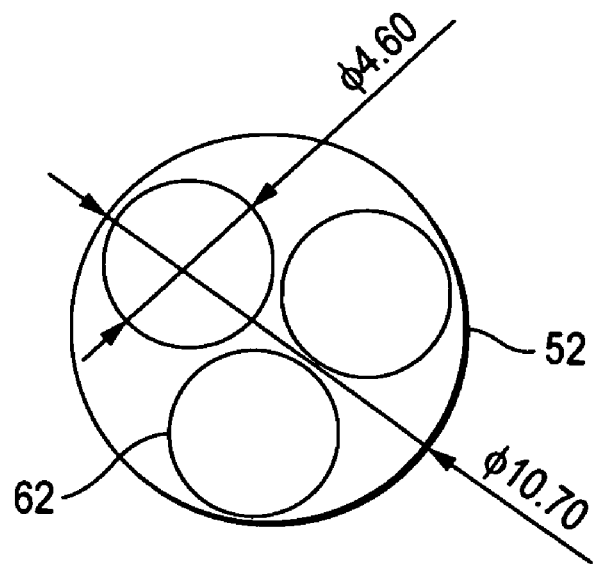
FIG. 8 is a schematic cross-sectional view showing a condition in which three 3 sq wires are received in a second corrugated tube.

FIG. 7 is a schematic cross-sectional view showing a condition in which three 10 sq wires 61 are received in the first corrugated tube 50. FIG. 8 is a schematic cross-sectional view showing a condition in which three 3 sq wires 62, each having a standard outermost diameter of 4.6 mm, are received in the second corrugated tube 52. Here, the second corrugated tube 52 has an inner diameter (nominal diameter) of 10 mm. Thus, depending on the kind and number of wires to be received, the diameter of the corrugated tube to be used is much varied, and therefore the pitch of the groove portions and the pitch of the ridge portions are varied.

Figure 10:
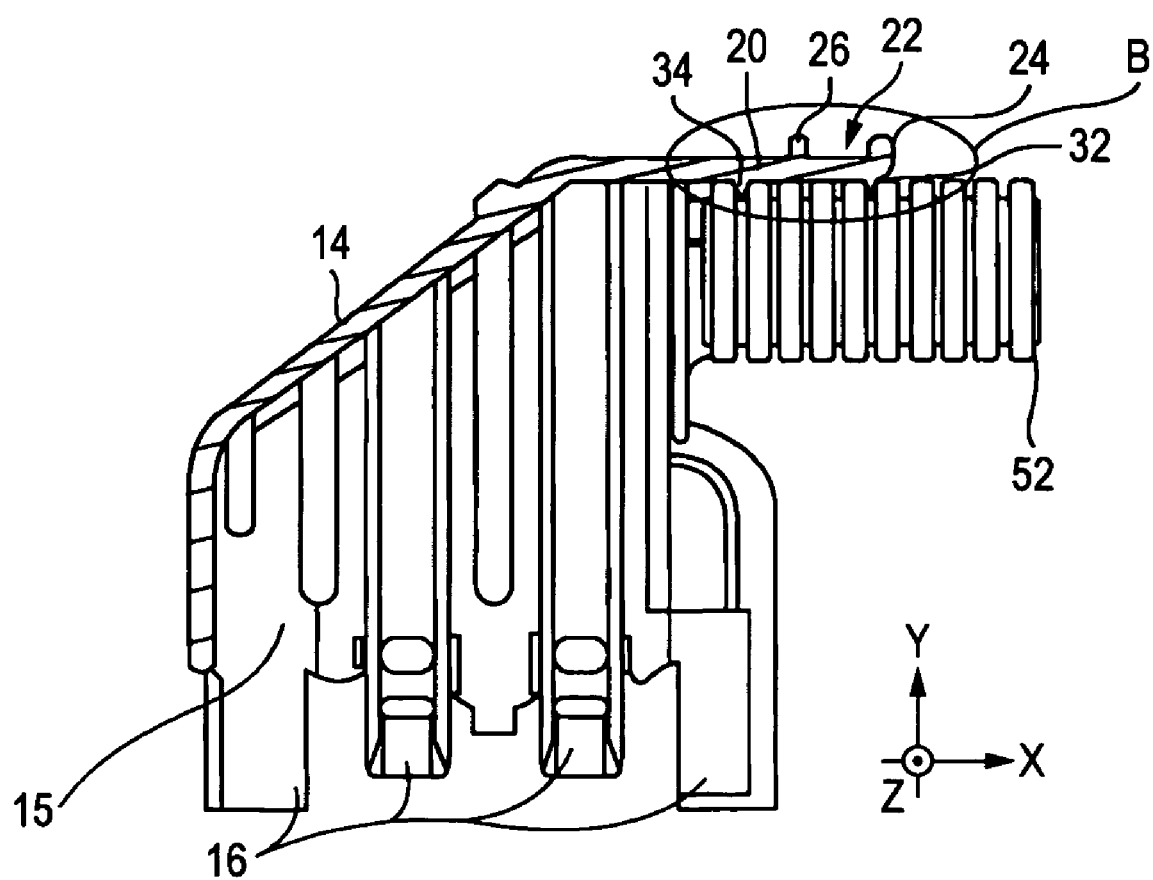
FIG. 10 is a cross-sectional view of the connector cover on which the second corrugated tube is mounted.
Figure 11:
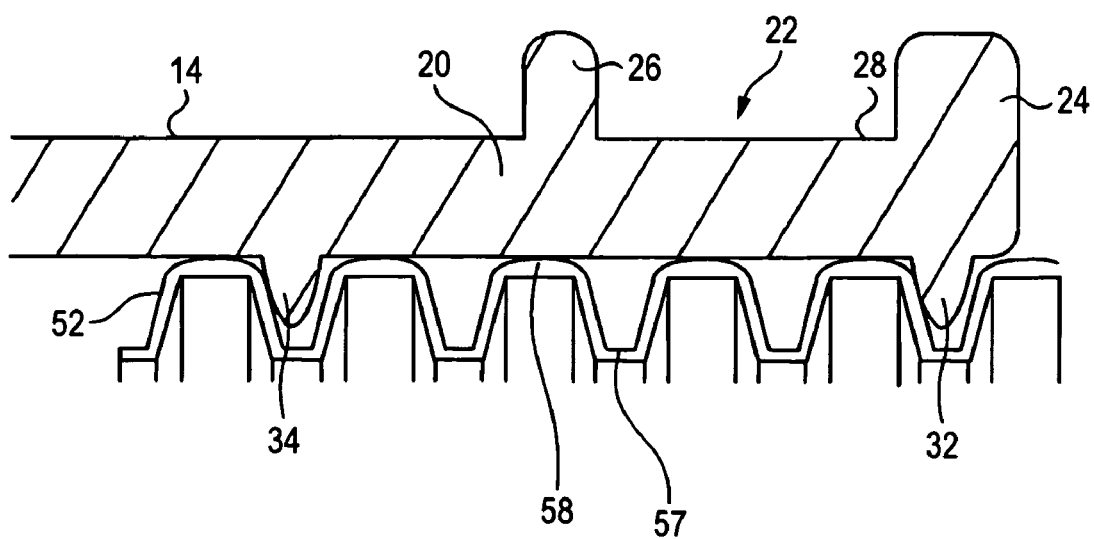
FIG. 11 is an enlarged view of a portion B of FIG. 10, showing a condition in which the second corrugated tube is mounted in the tube insertion portion.

FIGS. 9A and 9B are views similar to FIGS. 2A and 2B, but showing a condition in which the second corrugated tube 52 is mounted on the connector cover 14, and FIG. 9A is a side-elevational view, and FIG. 9B is a bottom view. FIG. 10 is a cross-sectional view of the connector cover 14 taken along the line A-A of FIG. 9B. FIG. 11 is an enlarged view of a portion B of FIG. 10, showing the tube insertion portion 20.

Here, the retained condition of the first corrugated tube 50 relative to the first and second retaining projections 32 and 34 of the tube insertion portion 20, as well as the retained condition of the second corrugated tube 52 relative to the first and second retaining projections 32 and 34, will be described. As shown in FIG. 6, the distance between the first retaining projection 32 and the second retaining projection 34 corresponds to three pitches of the groove portions 55 (or the ridge portions 56) of the first corrugated tube 50. Also, the distance between the first retaining projection 32 and the second retaining projection 34 corresponds to four pitches of the groove portions 57 (or ridge portions 58) of the second corrugated tube 52. For example, if one pitch of the groove portions 55 of the first corrugated tube 50 is 4 mm, and one pitch of the groove portions 57 of the second corrugated tube 52 is 3 mm, then the distance between the first retaining projection 32 and the second retaining projection 34 is the least common multiple, that is, 12 mm. Incidentally, this distance may not be the least common multiple, but may be an integral multiple of the least common multiple (for example, 24 mm). When it is intended to use two kinds of corrugated tubes having different groove (or ridge) pitches (3 mm and 5 mm), the distance between the first retaining projection 32 and the second retaining projection 34 is 15 mm which is a common multiple of the pitch (3 mm) and the pitch (5 mm).

Thus, even when either of the plurality of kinds of corrugated tubes having different groove (or ridge) pitches is to be mounted on the connector 10, either of the different corrugated tubes can be properly retained on both of the first and second retaining projections 32 and 34, since the distance between the first and second retaining projections 32 and 34 is a common multiple of the groove/ridge pitches of these corrugated tubes.

Figure 12:
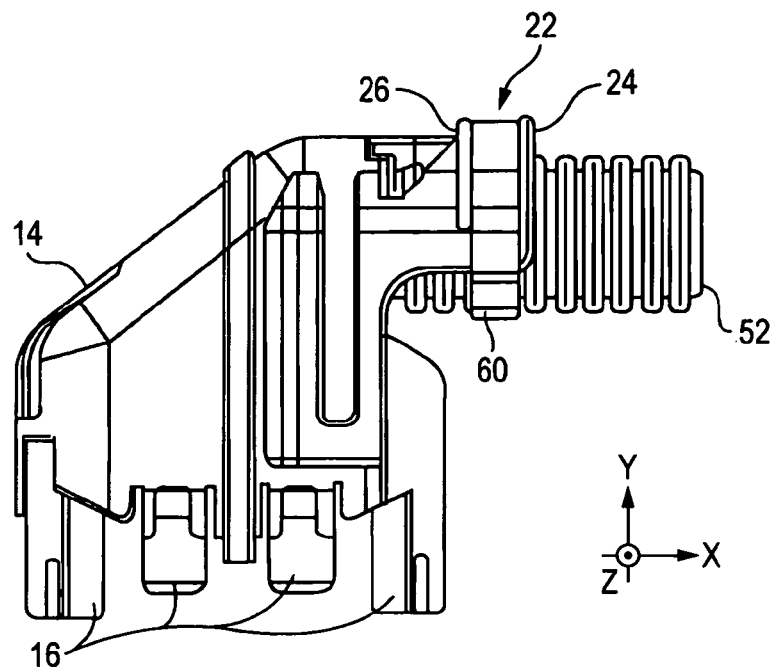
FIGS. 12A and 12B are views showing a condition in which the first corrugated tube is fixed to the tube insertion portion by a binding band.
Figure 12:
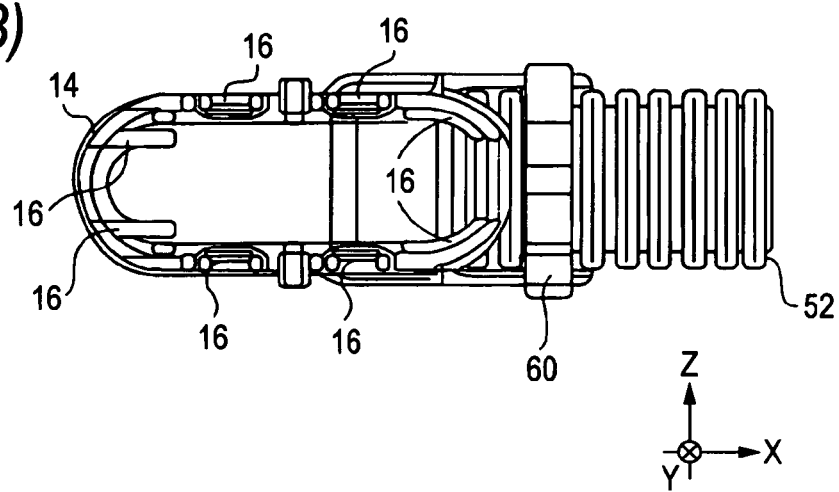
Figure 13:
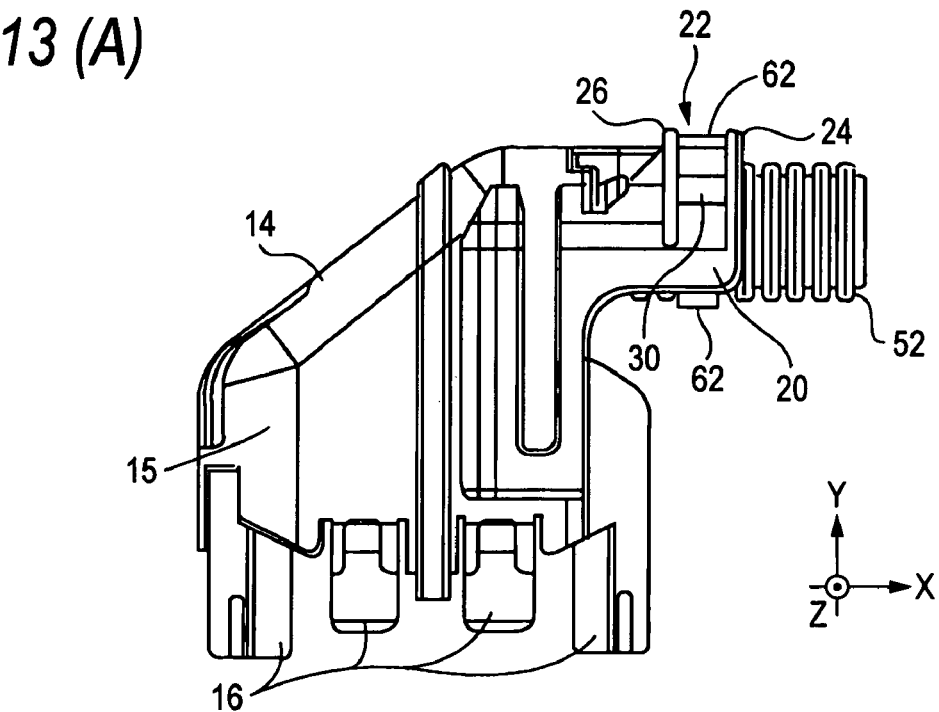
FIGS. 13A and 13B are views showing a condition in which the second corrugated tube is fixed to the tube insertion portion by a binding band.
Figure 13:
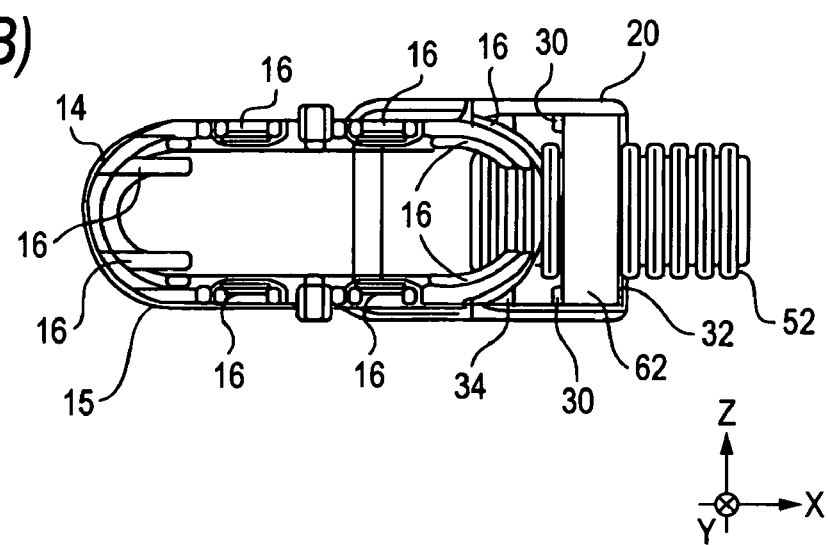

FIG. 12 is a view showing a condition in which the first corrugated tube 50 is fixed to the tube insertion portion 20 by the binding band 60. FIG. 13 is a view showing a condition in which the second corrugated tube 52 is fixed to the tube insertion portion 20 by the binding band 60.

As shown in FIG. 12, the outer diameter of the first corrugated tube 50 is generally equal to the inner diameter of the right open end (or opening) of the tube insertion portion 20, and the lower portion of the first corrugated tube 50 is much exposed (or projected) from the lower side of the tube insertion portion 20 when the connector cover 14 is viewed from the side. Therefore, the binding band 60 is wound around the outer periphery (generally over a half of the circumference) of the tube insertion portion 20, and suitably fixes the first corrugated tube 50 to the tube insertion portion 20.

On the other hand, the second corrugated tube 52 has the smaller diameter, and therefore when this second corrugated tube 52 is hardly exposed (or projected) from the lower side of the tube insertion portion 20 when the connector cover 14 is viewed from the side. When the binding band 60 is wound fully around the outer periphery of the tube insertion portion 20 so as to fix the second corrugated tube 52 to the tube insertion portion 20 as described above for the first corrugated tube 50, that portion of the second corrugated tube 52 contacted by the binding band 60 is small, and therefore it is feared that the corrugated tube 52 may not be properly fixed to the tube insertion portion 20. Also, in the case where the second corrugated tube 52 has no portion exposed (or projected) from the lower side of the tube insertion portion 20, this corrugated tube 52 can not be fixed to the tube insertion portion 20 by the binding band 60. Therefore, the binding band 30 is passed through the binding band passage holes 30, and is not wound fully around the outer periphery of the tube insertion portion 20, but is introduced halfway into the inside of the tube insertion portion 20, thereby securing the sufficient area of contact between the binding band 60 and the second corrugated tube 52, as shown in FIG. 13. By doing so, the second corrugated tube 52 can be properly fixed to the tube insertion portion 20.

Incidentally, when the position where each binding band passage hole 30 is formed in the tube insertion portion 20 is shifted upwardly (toward the plus side in the Y-axis direction) from the illustrated position, the distance between the two binding band passage holes 30 becomes smaller, so that a corrugated tube of a smaller diameter can be suitably fixed to the tube insertion portion 20.

As described above, in the above embodiment, different kinds of connector covers 14 do not need to be used for different kinds of wires (of different sizes), that is, for different kinds of corrugated tubes. Therefore, at a site where such a connector 10 is used, there is no need to prepare a plurality of kinds of connectors 10, and the cost for molds can be reduced by reducing the number of the component parts, and also the cost can be reduced by a mass-production effect achieved by the use of common parts, and furthermore the time and labor required for stock management of the parts can be reduced. Furthermore, only one kind of connector 10 is used for the plurality of kinds of corrugated tubes, and therefore there is no possibility that a wrong connector may be used when effecting the operation by the use of the connector.

Although the preferred embodiment of the present invention has been described above, this embodiment is merely one example of the invention, and the combination of the constituent elements can be modified in various ways, and it is obvious to those skilled in the art that such modified examples also fall within the scope of the invention. In the above embodiment, although the bellows-like tube having the alternate grooves and ridges (when viewed in the longitudinal cross-section) is mounted on the connector, a tube having a groove and a ridge spirally formed thereon may be mounted on the connector. In this case, each of the first and second retaining projections 32 and 34 is formed not into a plate-shape but for example into a pin-shape, and by doing so, a desired one of a plurality of tubes having different groove (or ridge) pitches can be mounted on the connector.

What is claimed is:

1. A connector on which a tube having an outer peripheral surface provided with a ridges and grooves at predetermined pitches can be mounted, comprising:
    a tube insertion portion;
    a plurality of retaining means formed on an inner side of the tube insertion portion so as to retain the tube inserted in the tube insertion portion, the retaining means being spaced a predetermined distance from each other;
    a binding band-restraining portion formed on an outer side of the tube insertion portion and extending in a direction of a periphery of the tube insertion portion, the binding band-restraining portion being adapted to position a binding band for fixing the tube to the retaining means when the tube is inserted in the tube insertion portion; and
    two band passage holes formed in the binding band-restraining portion, and disposed between the plurality of retaining means, wherein the binding band can be passed through one of the band passage holes from the outer side of the tube insertion portion to the inner side of the tube insertion portion, around the tube and out from the inner side of the tube insertion portion through the other of the band passage holes,
    wherein a desired one of a plurality of kinds of tubes can be mounted in the tube insertion portion; and the predetermined distance between the retaining means is a common multiple of the ridge/groove pitches of the plurality of tubes,
    wherein the tube insertion portion is a generally semi-cylindrical shape.

2. A connector on which a tube having an outer peripheral surface provided with a ridges and grooves at predetermined pitches can be mounted, comprising:
    a tube insertion portion;
    a plurality of retaining means formed on an inner side of the tube insertion portion so as to retain the tube inserted in the tube insertion portion, the retaining means being spaced a predetermined distance from each other;
    a binding band-restraining portion formed on an outer side of the tube insertion portion and extending in a direction of a periphery of the tube insertion portion, the binding band-restraining portion being adapted to position a binding band for fixing the tube to the retaining means when the tube is inserted in the tube insertion portion;
    two band passage holes formed in the binding band-restraining portion, and disposed between the plurality of retaining means, wherein the binding band can be passed through one of the band passage holes from the outer side of the tube insertion portion to the inner side of the tube insertion portion, around the tube and out from the inner side of the tube insertion portion through the other of the band passage holes; and
    wherein the binding band-restraining portion includes a first limitation wall and a second limitation wall which extend in a circumferential direction of the binding band-restraining portion outside the tube insertion portion,
    wherein a length of each of the first limitation wall and the second limitation wall in the circumferential direction is longer than a length of the band passage hole in the circumferential direction.

* * * * *